US008801365B2

(12) United States Patent
Bertea et al.

(10) Patent No.: US 8,801,365 B2
(45) Date of Patent: Aug. 12, 2014

(54) HYDRAULIC MACHINE, AND AN ENERGY CONVERSION INSTALLATION INCLUDING SUCH A MACHINE

(75) Inventors: Jean-Francois Bertea, Saint Jean de Muzols (FR); Gerard Vuillerod, Grenoble (FR)

(73) Assignee: Alstom Renewable Technologies, Grenoble (FR)

( * ) Notice: Subject to any disclaimer, the term of this patent is extended or adjusted under 35 U.S.C. 154(b) by 665 days.

(21) Appl. No.: 13/003,776

(22) PCT Filed: Jul. 13, 2009

(86) PCT No.: PCT/FR2009/051395
§ 371 (c)(1),
(2), (4) Date: Jan. 12, 2011

(87) PCT Pub. No.: WO2010/007306
PCT Pub. Date: Jan. 21, 2010

(65) Prior Publication Data
US 2011/0110764 A1    May 12, 2011

(30) Foreign Application Priority Data

Jul. 15, 2008   (FR) ...................................... 08 54798

(51) Int. Cl.
*F03B 11/06*   (2006.01)
(52) U.S. Cl.
USPC ........... 415/112; 415/111; 415/229; 415/230; 415/26; 415/174; 384/100
(58) Field of Classification Search
USPC ......... 415/17, 26, 47, 111–113, 168.1, 170.1, 415/174.1, 174.2, 174.3, 229–231; 416/174
See application file for complete search history.

(56) References Cited

U.S. PATENT DOCUMENTS 3,767,277 A * 10/1973 Woolcock ..................... 384/120
3,934,948 A    1/1976  Pruvot
(Continued)

FOREIGN PATENT DOCUMENTS

AU         411295 B2      3/1971
CA         1109361    *   9/1981 ............ F03B 11/066
(Continued)

*Primary Examiner* — Edward Look
*Assistant Examiner* — Danielle M Christensen
(74) *Attorney, Agent, or Firm* — Buchanan Ingersoll & Rooney PC

(57) ABSTRACT

This hydraulic machine comprises a wheel supported by a shaft (5), the wheel and the shaft being able to rotate about a vertical axis ($X_5$) while a radial hydrostatic or hydrodynamic bearing (100) is formed between, on the one hand, a radial peripheral surface (52) of the shaft and, on the other hand, an internal radial surface (102) of a member (101) that is fixed relative to the vertical axis. The bearing (100) extends between two edges (121, 122) which, in normal operation, constitute regions for the removal of a film of water formed in the bearing. At least one cavity (130) is created in the fixed member (101) and opens onto its internal radial surface (102) near a first edge (122) of the bearing. The machine comprises means (131, 132, 133) for placing the cavity (130) in fluidic communication with a volume ($V_1$) situated outside the bearing near the second edge (121) of the bearing (100). That allows some ($E_2$) of the film of water from the bearing (100) to be removed towards the second edge (121) if the bearing becomes obstructed near the first edge (122).

16 Claims, 5 Drawing Sheets

(56) References Cited

U.S. PATENT DOCUMENTS

| | | | |
|---|---|---|---|
| 3,998,502 A | | 12/1976 | Lothar et al. |
| 4,071,303 A | | 1/1978 | Guidez |
| 4,417,823 A | | 11/1983 | Drevet et al. |
| 4,685,813 A | | 8/1987 | Moog |
| 5,864,183 A | * | 1/1999 | Fisher et al. .................. 290/43 |
| 6,071,013 A | * | 6/2000 | Inaguma et al. ............. 384/103 |
| 6,490,506 B1 | * | 12/2002 | March .......................... 700/286 |
| 2002/0081044 A1 | * | 6/2002 | Shima ........................... 384/100 |
| 2003/0123765 A1 | * | 7/2003 | Hirano et al. ................ 384/118 |
| 2005/0087933 A1 | | 4/2005 | Gittler |
| 2006/0108745 A1 | * | 5/2006 | Van Schoor .................. 277/500 |

FOREIGN PATENT DOCUMENTS

| | | |
|---|---|---|
| DE | 2025636 A1 | 12/1971 |
| DE | 2356817 A1 | 2/1975 |
| FR | 1419857 A | 12/1965 |
| GB | 724737 A | 2/1955 |
| GB | 1121761 A | 7/1968 |
| JP | 2008089116 A | 4/2008 |
| WO | 81/01449 A1 | 5/1981 |
| WO | 2004018870 A | 3/2004 |

* cited by examiner

HYDRAULIC MACHINE, AND AN ENERGY CONVERSION INSTALLATION INCLUDING SUCH A MACHINE

BACKGROUND OF THE INVENTION

1. Field of The Invention

The present invention relates to a hydraulic machine that has a wheel supported by a shaft, said wheel and said shaft being mounted to move in rotation about an axis. The wheel of such a machine is designed to have a forced flow of water pass therethrough. Such a forced flow is a driving flow when the machine operates as a turbine. Such a flow is a driven flow when the machine operates as a pump.

2. Brief Description of the Related Art

In such a machine, a radial hydrostatic bearing can be provided around the shaft, with the function of taking up the radial forces to which said shaft is subjected. Such a bearing can be provided around an upper portion, around a lower portion, or around an intermediate portion of the shaft. It is known that a hydrostatic bearing can be equipped with an expansion seal, e.g. an inflatable seal, that makes it possible to protect the bearing from rising polluted water when the machine and the system for feeding water to the bearing are shut down. Such an inflatable seal is expanded during shut-downs of the machine, so as to isolate the bearing from its environment. Under normal operating conditions, the flow rate of water brought to the bearing is removed via the top and via the bottom of the bearing, thereby making it possible to procure both lift for the bearing and also removal of the energy dissipated by fluid friction, by generating of a continuous film of water. In the event that an inflation seal remains jammed in the expanded configuration, the water in the bearing cannot be removed towards the bottom of the bearing, which disturbs the flow of the water and the operation of the bearing. The lift of the bearing is reduced and the water that is held captive in the lower portion of the bearing tends to heat up, with a risk of the film of water being totally or partially transformed into steam, and a risk of the shaft coming into contact with the stationary bushing of the bearing.

These problems can also arise with a bearing that is not provided with an inflatable seal and in which removal of water from the bearing is obstructed, upwards or downwards, by any other obstacle.

Analogous problems can arise with horizontal-axis machines, which machines can also be equipped with hydrostatic or hydrodynamic seals.

It is also known, from U.S. Pat. No. 4,071,303, to provide the outside surface of a pump rotor with recesses for feeding a water bearing. Those recesses are connected to the upper edge and to the lower edge of the rotor via channels for removing solid bodies that could penetrate into the recesses. In the event that the bearing is obstructed, in the upper portion or in the lower portion, the film of water that makes up the bearing cannot be removed and might be transformed into steam, thereby limiting the lift of the bearing or reducing said lift to zero.

SUMMARY OF THE INVENTION

More particularly, an object of the invention is to remedy those drawbacks by proposing a hydraulic machine equipped with a radial hydrostatic bearing that operates more reliably.

To this end, the invention provides a hydraulic machine including a wheel supported by a shaft, the wheel and the shaft being mounted to move in rotation about an axis, while a radial hydrostatic or hydrodynamic bearing is formed between firstly a radially peripheral surface of the shaft and secondly a radially inside surface of a member that is stationary relative to the axis, the bearing extending between two edges that, when the bearing is operating normally, constitute removal zones for removing a film of water that is formed in the bearing. Said machine is characterized in that at least one cavity is provided in the stationary member and opens out onto its radially inside surface in the vicinity of a first one of the two edges of the bearing, and in that the stationary member is provided with means for putting the cavity into fluid communication with a volume situated outside the bearing, in the vicinity of the second of the above-mentioned two edges, the cavity and the communication means being suitable for removing a fraction of a flow forming the film of water, in the event that removal of the film is impossible at the first edge.

By means of the invention, in the event that the water of the radial hydrostatic or hydrodynamic bearing is prevented from being removed in the vicinity of a first edge that may be a top, bottom, front, or back edge, depending on whether the machine is of vertical or of horizontal axis, the cavity and the communication means provided in the stationary member make it possible to remove water from the bearing towards the other edge thereof, thereby avoiding generating a zone of dead water in the bearing. The flow of water in the bearing can thus be maintained, even in the event of obstruction of one of the edges of the bearing, thereby making it possible to maintain the lift of the bearing.

According to advantageous but non-essential aspects of the invention, such a machine may incorporate one or more of the following characteristics:

An expansion seal is disposed in the vicinity of the edge of the bearing that faces towards the wheel. In which case, when the machine is of vertical axis, the cavity is advantageously provided above the expansion seal, in the vicinity of the lower edge of the bearing that faces towards the wheel, while the communication means connect the cavity to a volume of the machine that is situated above the upper edge relative to the bearing. When the machine is of vertical axis, the cavity may be provided in the vicinity of the upper edge of the bearing, while the communication means connect the cavity to a lower portion of the bearing, above the expansion seal that is disposed below the lower edge of the bearing.

The cavity is an annular groove provided in the stationary member. In a variant, the cavity is formed by an association of a plurality of non-touching cavities that open out onto the radially inside surface of the stationary member, and each of which is connected to a duct provided in the stationary member and belonging to the communication means.

The communication means include pressure reduction means.

The communication means include at least one duct connecting the cavity to the volume situated in the vicinity of the second edge of the bearing.

Means are provided for determining the water pressure in a duct belonging to the communication means. In which case, the pressure determination means are advantageously suitable for delivering a signal representative of the water pressure in the above-mentioned duct to a control unit for controlling the machine.

The cavity extends at an axial distance from the first edge that has a value less than 10% of the axial dimension of the bearing, and preferably less than 5% of said axial dimension.

The cavity has an axial dimension having a value lying in the range 2.5% of the axial dimension of the bearing to 5% of said axial dimension.

The cavity has a radial depth having a value at least twenty-five times greater than the radial thickness of the bearing, and preferably fifty times said radial thickness.

The invention also provides an installation for converting hydraulic energy into electrical or mechanical energy, or vice versa, said installation including a hydraulic machine as mentioned above. Such an installation is more reliable than state-of-the-art installations insofar as it makes it possible to accommodate any obstruction of a radial hydrostatic bearing, in the vicinity of one of the edges thereof, namely its upper edge or its lower edge.

BRIEF DESCRIPTION OF THE DRAWINGS

The invention can be better understood and other advantages of the invention appear more clearly from the following description of three embodiments of a machine and of an installation that comply with the principle of the invention, the description being given merely by way of example and with reference to the accompanying drawings, in which.

DESCRIPTION OF THE PREFERRED EMBODIMENTS

Figure 1:
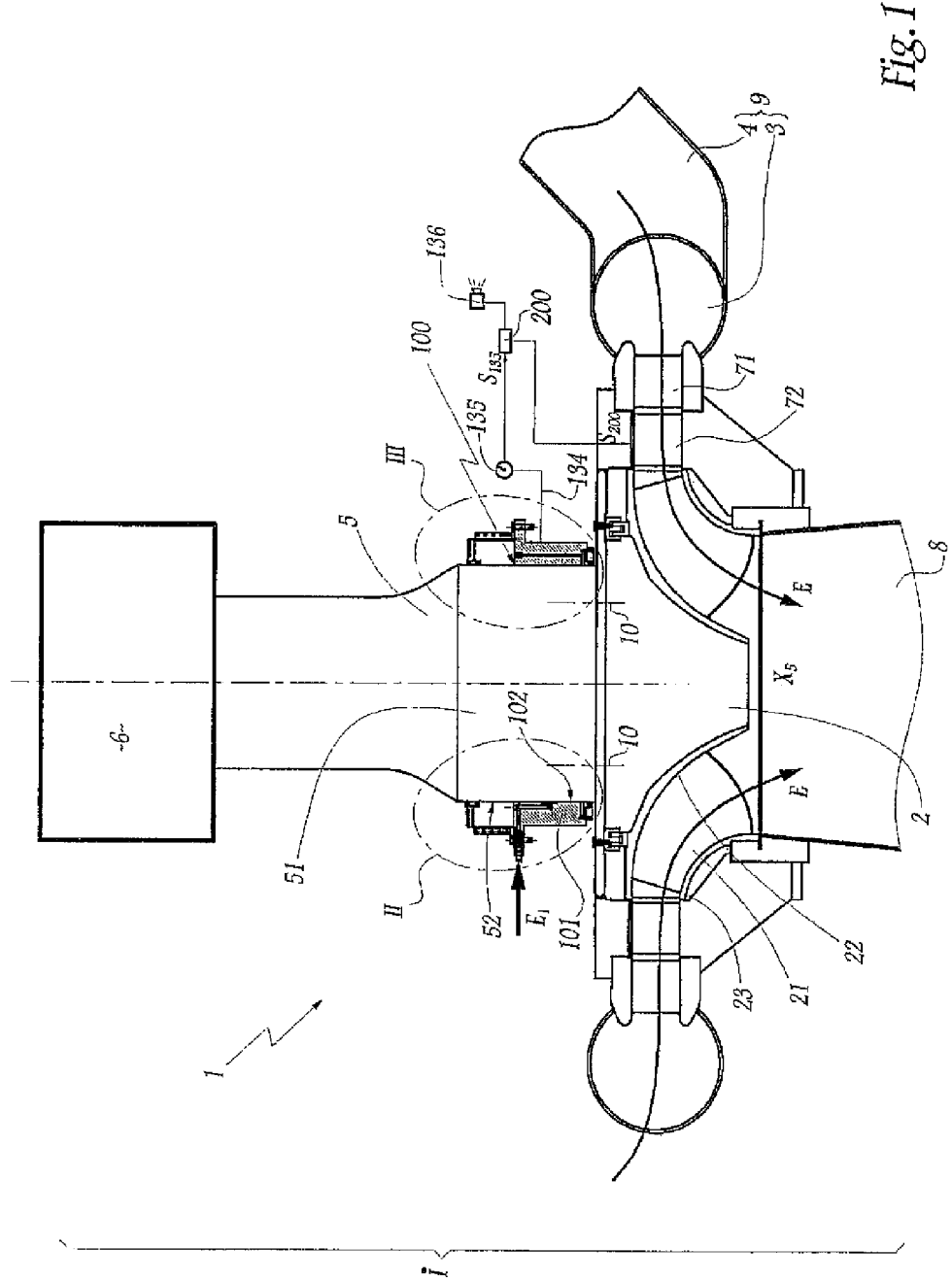
FIG. 1 is an axial section view showing the principle of a machine and of an installation in a first embodiment of the invention.

The installation I shown in FIG. 1 includes a Francis turbine 1 whose wheel or "runner" 2 is fed from a casing 3 into which a forced-flow duct 4 opens out. The turbine 1 also includes a shaft 5 on which the wheel 2 is mounted and that rotates with said wheel about a vertical axis $X_5$ that is also the longitudinal axis of the shaft 5. The shaft 5 rotates the rotary portion of an alternator 6.

Between the casing 3 and the wheel 2 there are disposed two series of stationary guide vanes 71 and of wicket gates 72 whose function is to guide and to regulate a flow E that is coming from the duct 4 and from the casing 3 and that is to pass through the wheel 2 towards a suction duct 8.

The wheel 2 is provided with blades 21 that extend between a ceiling 22 and a belt 23.

The elements 3 and 4, and the civil engineering structure that support the turbine 1 are part of a stationary structure 9 relative to which the wheel 2 rotates about the axis $X_5$.

The wheel 2 is fastened to the lower end 51 of the shaft 5 or "base of the shaft", by means of screws 10 that are represented by lines marking their axes. The base of the shaft may be formed integrally with the remainder of the shaft, or else be mounted thereon.

Figure 2:
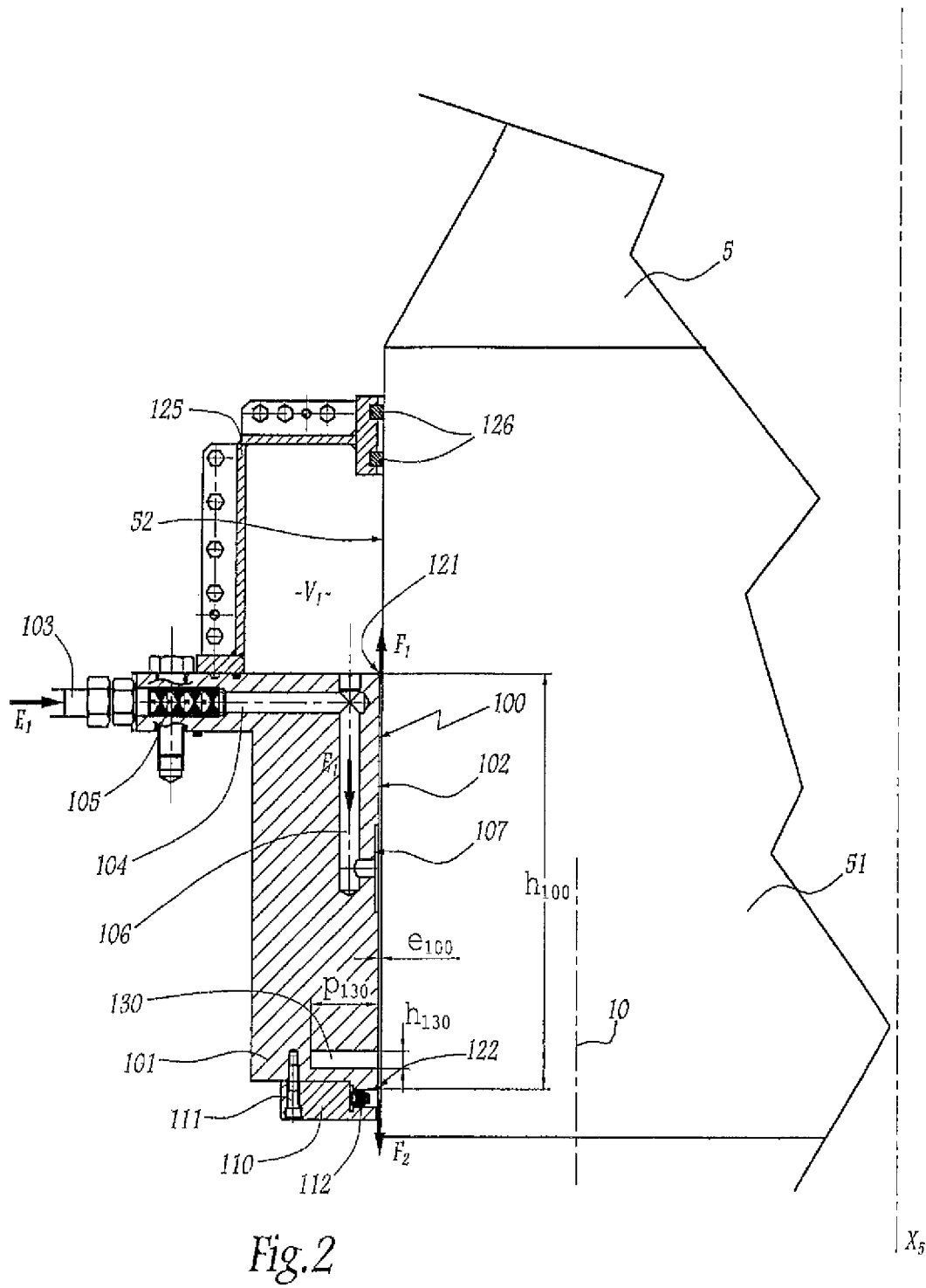
FIG. 2 is a view on a larger scale of the detail II in FIG. 1.
Figure 3:
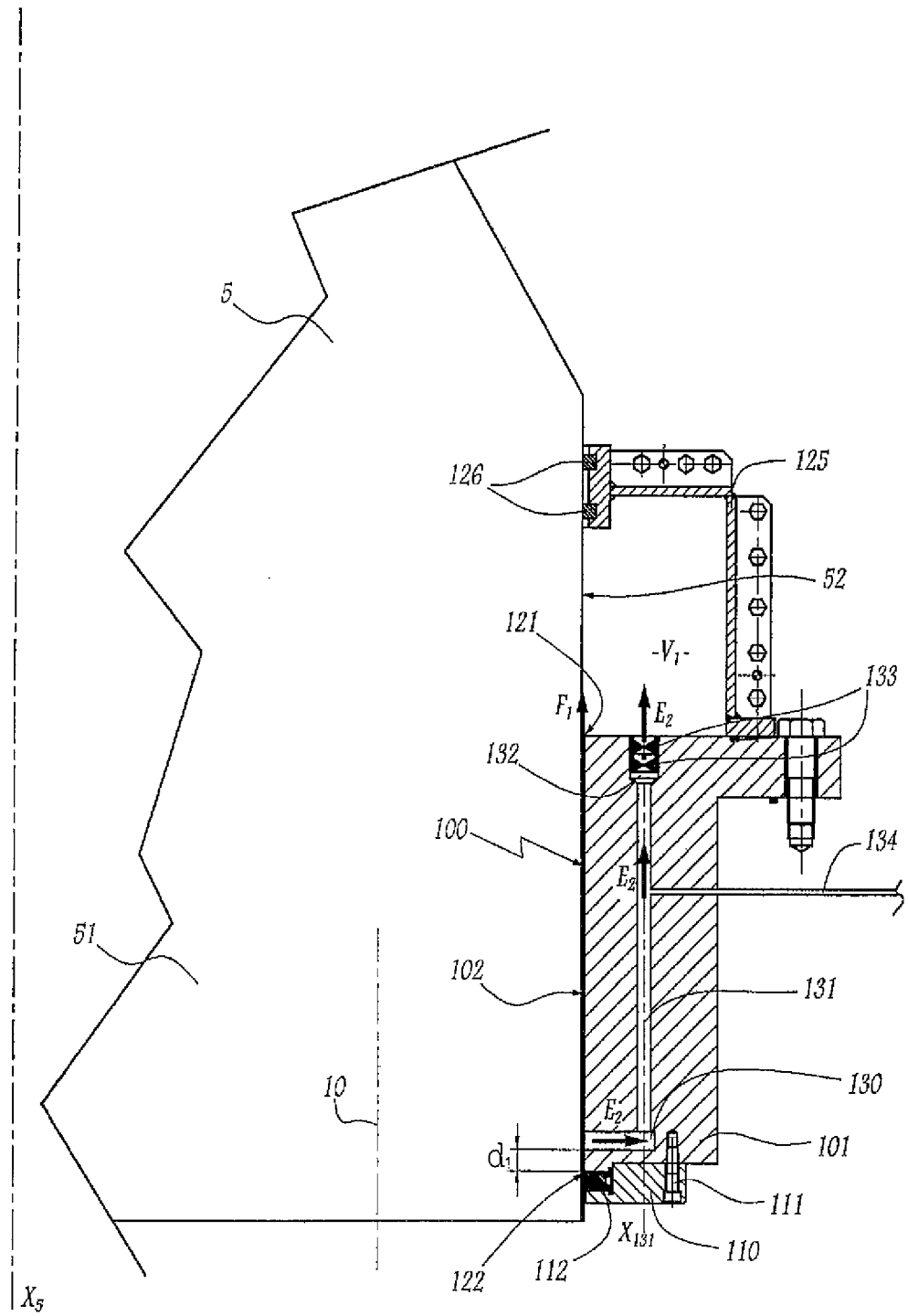
FIG. 3 is a view on a larger scale of the detail III of FIG. 1 when an inflatable seal of the installation is jammed.
Figure 4:
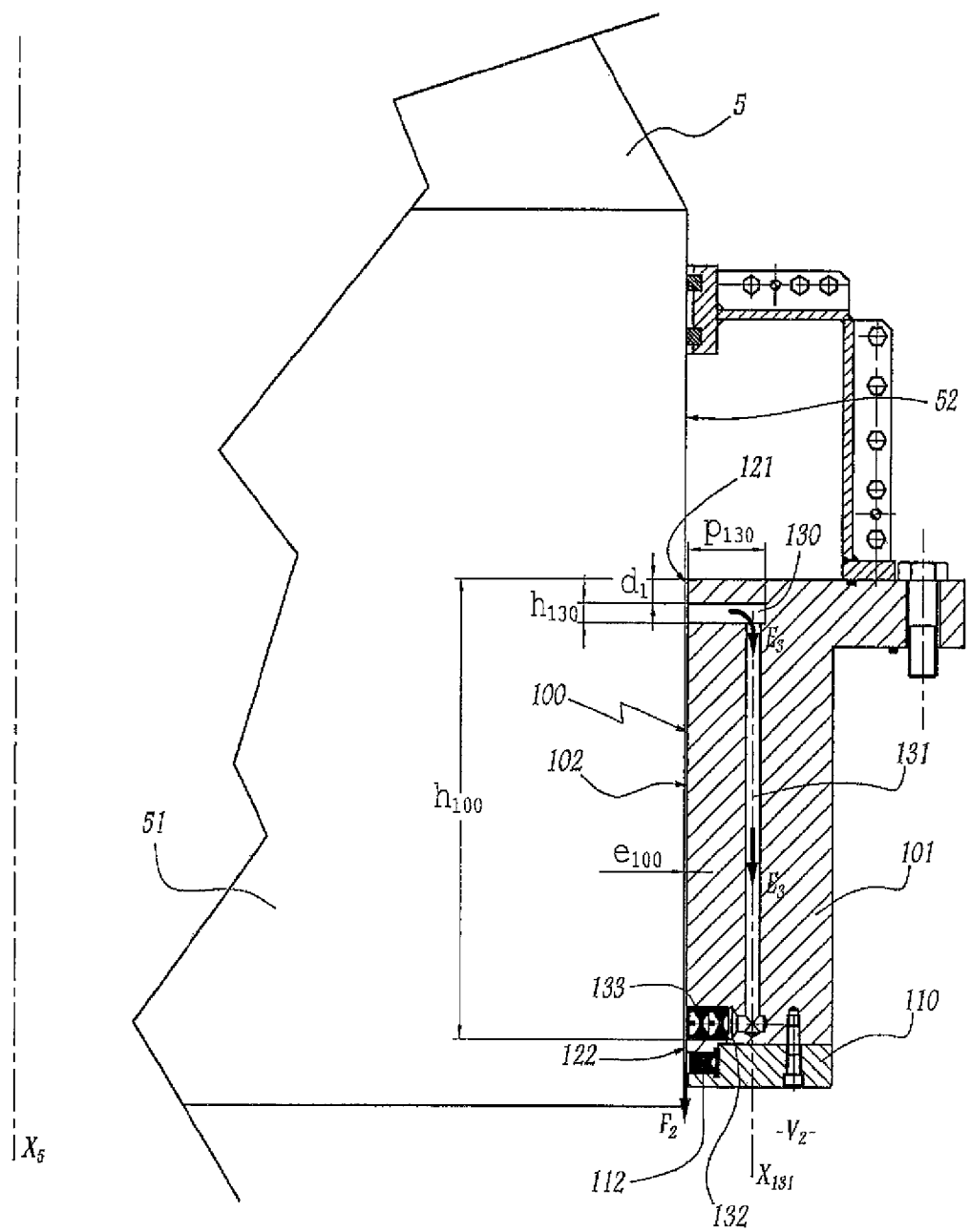
FIG. 4 is a view analogous to FIG. 3 for a machine and an installation in a second embodiment of the invention.

In order to withstand the radial forces to which the base 51 of the shaft is subjected, a hydrostatic bearing 100 is formed between the radially outside surface 52 of the base 51 of the shaft and a radially inside surface 102 of a bushing 101 of annular shape that is disposed around the base 51 of the shaft. In FIGS. 2 to 4, the radial thickness $e_{100}$ of the bearing 100 is exaggerated in order to make the drawing clearer.

A flow $E_1$ of clean water is delivered to the bearing 100, from the forced-flow duct 4, by means of a duct 103 connected to a tapping 104 provided in the bushing 101. In order to make the drawing clearer, the connection between the ducts 4 and 103 is not shown in the figures. The tapping 104 is equipped with a series of diaphragms 105 that make it possible to limit the pressure of the flow $E_1$ downstream. The tapping 104 opens out into a channel 106 that feeds a depression 107 provided in the surface 102 and making it possible to distribute the flow $E_1$. This makes it possible to force water into the bearing 100 in order to guarantee that a continuous film of water is provided around the surface 52.

In the present description, the words "top", "bottom", "upper", and "lower", and "upwards" and "downwards" correspond to the installation I being disposed in an operating configuration in which the axis $X_5$ is vertical and the top of a member points towards the top of FIG. 1, while the bottom of the member points towards the bottom of FIG. 1. The adjective "upper" describes a portion of a member that points towards the top, conversely to a "lower" portion that points downwards.

A flange 110 is mounted at the bottom portion of the bushing 101 by means of fastener screws 111. This flange co-operates with the bushing 101 to define a housing for receiving an inflatable seal 112 that is suitable for coming into abutment against the surface 52 depending on whether or not it is fed with pressurized fluid, which fluid is pressurized water in this example. The inflatable seal 112 is a type of expansion seal that makes it possible to protect the bearing 100 from water rising from the wheel 2. Other types of expansion seal may be used with the invention, e.g. an axial seal.

Reference 121 designates the upper edge of the bearing 100, i.e. the upper limit of the gap of small thickness $e_{100}$ defined between the surfaces 52 and 102, and in which a film of water is formed from the flow $E_1$. In practice, the edge 121 is situated at the same height as the upper edge of the surface 102. Similarly, reference 122 designates the lower edge of the bearing 100 that is defined by the lower edge of the surface 102, above the housing for receiving the seal 112.

An upper tank 125 is mounted on the bushing 101 and defines an annular volume $V_1$, above the edge 121 and radially around the portion of the surface 52 that is not facing the surface 102. The tank 125 carries two seals 126 that come into abutment against the surface 52, in order to avoid upward water leaks. The volume $V_1$ is connected via an overflow (not shown) to the sump well of the installation I, i.e. to the portion of the installation in which the leaks are collected, before they are removed downstream.

When the bearing 100 is operating normally, i.e. when the shaft 5 is rotating about the axis $X_5$, the flow $E_1$ forms a film of water inside the bearing 100, between the edges 121 and 122, and is then removed upwards and downwards, as indicated respectively by arrows $F_1$ and $F_2$ in FIG. 2. This continuous removal of the flow $E_1$ from the bearing 100 guarantees the lift of said bearing.

In the event that the turbine 1 is shut down, and in order to prevent potentially polluted water from rising towards the inside of the bearing 100, the inflatable seal 112 is put under pressure, so that it shrinks radially towards the axis $X_5$ and comes into abutment against the surface 52, thereby forming a leaktight barrier.

When the turbine 1 is started up again, and before the shaft 5 is caused to start rotating, the seal 112 normally resumes its configuration shown in FIG. 2, in which it is spaced apart from the surface 52. However, it can happen that the seal might be damaged and remain in the configuration in which it bears against the surface 52, even though the shaft 5 is rotating, as shown in FIG. 3. In such a situation, the fraction of the flow $E_1$ that is normally removed from the bearing 100 at the lower edge 122, as indicated by arrow $F_2$, could remain captive in the bearing 100, which would be detrimental to operation thereof, in particular because the lift would be reduced and because that would give rise to localized heating of the film of water, or indeed to transformation thereof into steam.

An annular grove 130 is provided in the bushing 101 and opens out onto the surface 102 all the way around the axis $X_5$. Reference $d_1$ designates the axial distance between the groove 130 and the edge 122. The distance $d_1$ is the distance between the lower edge of the groove 130 and the edge 122. Reference $h_{100}$ designates the height or axial length of the bearing 100, said distance and said height being measured parallel to the axis $X_5$. The distance $d_1$ is chosen to be less than 10% of the height $h_{100}$, and preferably to be less than 5% of said height.

Reference $h_{130}$ designates the height or axial length of the groove 130, as measured parallel to the axis $X_5$. The height $h_{130}$ is considerably smaller than the height $h_{100}$, so that the presence of the groove 130 does not disturb the thickness $e_{100}$ over most of the bearing 100 that is situated above the groove 130. For example, for a bearing 100 of height $h_{100}$ lying in the range 300 millimeters (mm) to 400 mm, the groove 130 has an axial height $h_{130}$ lying in the range 10 mm to 15 mm. In practice, the value of the axial height $h_{130}$ represents in the range 2.5% to 5% of the axial height $h_{100}$.

Reference $p_{130}$ designates the radial depth of the groove 130, i.e. the depth over which it extends into the bushing 101 from the surface 102. This depth is at least twenty-five times greater than the thickness $e_{100}$, and is preferably greater than fifty times said thickness.

The groove 130 is in communication with four ducts 131, only one of which is visible in FIG. 3, and that are distributed uniformly in the bushing 101 about the axis $X_5$. Each duct 131 extends along an axis $X_{131}$ parallel to the axis $X_5$ and connects the groove 130 to a housing 132 in which a plurality of diaphragms 133 are disposed, and that opens out into the volume $V_1$. The ducts 131 are separated from the bearing 100 by the material of the bushing 101, by means of the value of the depth $p_{130}$.

Thus, in the event that the seal 112 remains jammed in the expanded configuration, thereby preventing the flow $E_1$ from being removed downwards, the corresponding fraction $E_2$ of the flow $E_1$ can flow into the groove 130 and into the ducts 131 and then through the diaphragms 133, to reach the volume $V_1$ from which it can be removed to the sump well. This thus makes it possible to guarantee that the water in the bearing 100 flows continuously in its lower portion, even in the event of malfunctioning of the inflatable seal 112.

A fraction of the flow $E_1$ continues to be removed from the bearing 100 at the edge 121, as indicated by arrow $F_1$. This fraction joins the flow $E_2$ in the volume $V_1$.

The diaphragms 133 guarantee head loss at the housing 132, so that, when the inflatable seal 112 is operating correctly, the total head loss through the portions 130, 131, and 132 is greater than the head loss at the edge 122, so that the flow in the direction indicated by arrow $F_2$ in FIG. 2 is given preference.

The elements 130 to 133 also enable any polluted flow rising from the wheel 2 in the event of ineffectiveness of the inflatable seal 112 during a shutdown to be removed directly to the volume $V_1$. Such polluted water can be drained through the groove 130, through the ducts 131, and through the housings 132, thereby making it possible to protect the bearing 100 from pollution.

A tapping 134 opening out into one of the ducts 131 is connected to a pressure gauge 135 that indicates the water pressure inside at least one of the ducts 131. The pressure gauge 135 can deliver a signal $S_{135}$ representative of the pressure inside the duct(s) 131 to a control unit 200. This signal enables the unit 200 to detect an operating defect, insofar as a variation in pressure in one of the ducts 131 corresponds to the bottom outlet of the bearing 100, at its edge 122, being obstructed or, during a shutdown, to the seal 112 leaking. The unit 200 can thus modify the operating conditions of the turbine 1 by taking account of such an anomaly, e.g. by sending to the wicket gates 72 a signal $S_{200}$ aiming to reduce the rate of the flow E progressively. As a function of the signal $S_{135}$, the unit 200 can also actuate an audible or visible alarm 136.

The embodiment shown in FIGS. 1 to 3 makes it possible to take account of an obstruction at the lower portion of the bearing 100, independently of the use of the inflatable seal 112. If the bearing 100 is obstructed in the vicinity of the edge 122 by something other than the seal 112, the flow $E_2$ can flow through the volumes 130 to 132.

In the second embodiment of the invention shown in FIG. 4, elements analogous to the elements in the first embodiment bear like references. A radial hydrostatic bearing 100 is defined between the outer radial surface 52 of the base 51 of a shaft 5 and the inner radial surface 102 of a stationary bushing 101. An inflatable seal 112 is mounted on the bushing 101 by means of an annular flange 110.

An annular groove 130 is provided in the vicinity of the upper edge 121 of the bearing 100 and connected to four ducts 131, each of which extends parallel to an axis $X_{131}$ parallel to the axis of rotation $X_5$ of the shaft 5. At its end opposite from the groove 130, each duct 131 opens out into a housing 132 that itself opens out onto the surface 102, above the lower edge 122 of the bearing 100. Diaphragms 133 are disposed in the housing 132, and they have the same function as the diaphragms of the first embodiment.

Reference $d_1$ designates the axial distance between the edge 121 and the groove 130, reference $h_{100}$ designates the axial height of the bearing 100, reference $e_{100}$ designates its radial thickness, reference $h_{130}$ designates the axial height of the groove 130, and reference $p_{130}$ designates its radial depth. $d_1$ is less than 10% of $h_{100}$, and preferably less than 5% thereof. $h_{130}$ lies in the range 2.5 to % of $h_{100}$ to 5% thereof. $p_{130}$ is greater than twenty-five times $e_{100}$, and preferably greater than fifty times $e_{100}$.

In the event that the upper portion of the bearing 100 is obstructed, e.g. by waste flowing from the volume $V_1$, a fraction $E_3$ of the feed flow of the bearing 100 flows into the groove 130 and into the ducts 131, and then flows back out at the lower portion of the bearing, i.e. in the vicinity of its lower edge 122, through the housings 132. Whereupon, the water coming from the upper portion of the bearing 100, through the elements 130 to 132 can be removed downwards towards a volume $V_2$ situated under the bearing, together with the water coming directly from the lower portion of the bearing 100, as indicated by arrow $F_2$ in FIG. 4.

The technical characteristics of the two above-described embodiments may be combined. In particular, a machine of the invention may have both a groove 130 in the bottom portion that is connected via ducts 131 to the volume $V_1$ and a groove 130 in the top portion that is connected via ducts 131 to the bottom portion of the bearing 100.

The number of ducts 131 is not necessarily equal to four, and it can be adapted as a function of the foreseeable rate(s) of the flows $E_2$ and/or $E_3$ to be removed in the event of localized obstruction of the bearing.

Although advantageous for circumferentially distributing the flows $E_2$ and $E_3$, it is not essential to use a peripheral groove 130. A plurality of non-touching cavities opening out in the surface 102 may be provided, each of which extends over a predetermined angular sector, and is connected to a duct of the same type as the above-mentioned ducts 131.

Finally, the rotary surface defined by the radial hydrostatic bearing may belong to a portion of the shaft that is formed integrally with the main portion thereof, as mentioned above as regards the base 51 of the shaft, or else it may belong to a portion mounted on said main portion.

In the two above-mentioned embodiments, the groove 130 and the communication means 131, 132, and 133 are active for removing a fraction $E_2$ or $E_3$ of the film of water, only in the event of obstruction of the edge 122 or 121 of the bearing 100 that is in the vicinity of the groove 130. When the bearing 100 is operating normally, the head loss induced by the diaphragms 133 is such that the film of water flows in preference via the edges 121 and 122.

Figure 5:
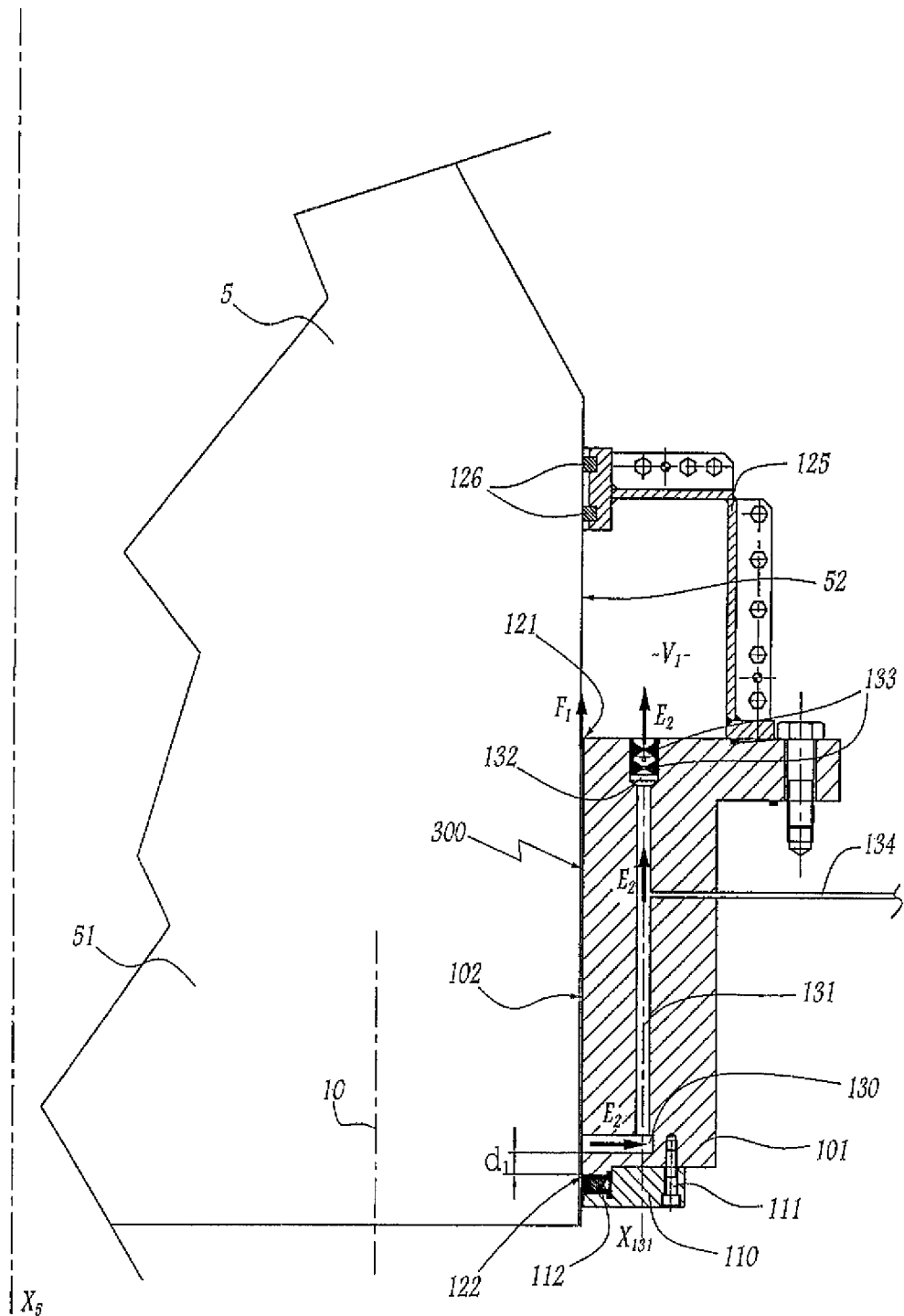
FIG. 5 is a view analogous to FIG. 3 for a machine and an installation in a third embodiment of the invention.

The invention is described and shown with a bearing 100 of the hydrostatic type, i.e. with a bearing whose lift depends essentially on the feed pressure at which the bearing is fed with water. As shown in FIG. 5, where all references under 200 are the same as on FIG. 3, the invention may also be implemented with a hydrodynamic bearing 300 in which the lift is obtained by the speed of rotation of the shaft. The invention is described above and shown with reference to a machine of vertical axis. However, the invention is also applicable to machines of horizontal axis, or indeed of slanting axis, which machines may also be equipped with hydrostatic or hydrodynamic bearings.

The invention claimed is:

1. A hydraulic machine comprising:
 a wheel supported by a shaft, the wheel and the shaft being mounted to move in rotation about an axis,
 a radial hydrostatic or hydrodynamic water bearing is formed between a radially peripheral surface of the shaft and a radially inside surface of a stationary member that is stationary relative to the axis, the bearing extending between two opposite gap limits that, when the bearing is operating normally, constitute outlet zones for discharging a film of water that is formed in the bearing,
 at least one liquid receiving cavity is provided in the stationary member and opens to the inner radial surface of the stationary member adjacent to a first one of the two opposite gap limits of the bearing, and
 the stationary member is provided with flow communication means for putting the cavity into fluid communication with a volume situated outside the bearing adjacent the second of the two opposite gap limits of the bearing, the cavity and the flow communication means removing a portion of a flow forming the film of water when removal of the film of water is obstructed at the first of the two opposite gap limits,
 wherein an expansion seal is disposed adjacent one of the two opposite gap limits of the bearing.

2. A hydraulic machine comprising:
 a wheel supported by a shaft, the wheel and the shaft being mounted to move in rotation about an axis,
 a radial hydrostatic or hydrodynamic water bearing is formed between a radially peripheral surface of the shaft and a radially inside surface of a stationary member that is stationary relative to the axis, the bearing extending between two opposite gap limits that, when the bearing is operating normally, constitute outlet zones for discharging a film of water that is formed in the bearing,
 at least one liquid receiving cavity is provided in the stationary member and opens to the inner radial surface of the stationary member adjacent to a first one of the two opposite gap limits of the bearing, and
 the stationary member is provided with flow communication means for putting the cavity into fluid communication with a volume situated outside the bearing adjacent the second of the two opposite gap limits of the bearing, the cavity and the flow communication means removing a portion of a flow forming the film of water when removal of the film of water is obstructed at the first of the two opposite gap limits,
 wherein an expansion seal is disposed adjacent one of the two opposite gap limits of the bearing, and the expansion seal faces towards the shaft.

3. A hydraulic machine comprising:
 a wheel supported by a shaft, the wheel and the shaft being mounted to move in rotation about an axis,
 a radial hydrostatic or hydrodynamic water bearing is formed between a radially peripheral surface of the shaft and a radially inside surface of a stationary member that is stationary relative to the axis, the bearing extending between two opposite gap limits that, when the bearing is operating normally, constitute outlet zones for discharging a film of water that is formed in the bearing,
 at least one liquid receiving cavity is provided in the stationary member and opens to the inner radial surface of the stationary member adjacent to a first one of the two opposite gap limits of the bearing, and
 the stationary member is provided with flow communication means for putting the cavity into fluid communication with a volume situated outside the bearing adjacent the second of the two opposite gap limits of the bearing, the cavity and the flow communication means removing a portion of a flow forming the film of water when removal of the film of water is obstructed at the first of the two opposite gap limits,
 wherein an expansion seal is disposed adjacent one of the two opposite gap limits of the bearing, and the expansion seal faces towards the shaft, and
 wherein the shaft rotates about a vertical axis and the cavity is provided above the expansion seal adjacent to a lower of the two opposite gap limits of the bearing, and wherein the flow communication means connect the cavity to the volume that is situated above an upper of the two opposite gap limits relative to the bearing.

4. A hydraulic machine comprising:
 a wheel supported by a shaft, the wheel and the shaft being mounted to move in rotation about an axis, a radial hydrostatic or hydrodynamic water bearing is formed between a radially peripheral surface of the shaft and a radially inside surface of a stationary member that is stationary relative to the axis, the bearing extending between two opposite gap limits that, when the bearing is operating normally, constitute outlet zones for discharging a film of water that is formed in the bearing,
 at least one liquid receiving cavity is provided in the stationary member and opens to the inner radial surface of the stationary member adjacent to a first one of the two opposite gap limits of the bearing, and
 the stationary member is provided with flow communication means for putting the cavity into fluid communication with a volume situated outside the bearing adjacent the second of the two opposite gap limits of the bearing, the cavity and the flow communication means removing a portion of a flow forming the film of water when removal of the film of water is obstructed at the first of the two opposite gap limits,
 wherein an expansion seal is disposed adjacent one of the two opposite gap limits of the bearing, and the expansion seal faces towards the shaft, and wherein the shaft rotates about a vertical axis, the cavity is provided adjacent to an upper of the two opposite gap limits of the bearing, and wherein the flow communication means connect the cavity to a lower portion of the bearing above the expansion seal that is disposed below a lower of two opposite gap limits of the bearing.

5. The machine according to claim 1, wherein the cavity is an annular groove provided in the stationary member.

6. The machine according to claim 1, wherein the cavity is formed by an association of a plurality of spaced cavities that open to the inner radial surface of the stationary member, and each of which is connected to a duct provided in the stationary member and forming a portion of the flow communication means.

7. The machine according to claim 1, wherein the flow communication means include pressure reduction means.

8. The machine according to claim 1, wherein the flow communication means include at least one duct connecting the cavity to the volume situated in the vicinity of a second of the two opposite gap limits of the bearing.

9. The machine according to claim 1, wherein pressure determination means for determining the water pressure in a duct forming a portion of the flow communication means.

10. The machine according to claim 9, wherein the pressure determination means sends signals representative of water pressure in the duct to a control unit for controlling the machine.

11. The machine according to claim 1, wherein the cavity extends at an axial distance from the first of the two opposite gap limits that has a value less than 10% of an axial dimension of the bearing.

12. The machine according to claim 1, wherein the cavity has an axial dimension having a value lying in a range of 2.5% of the axial dimension of the bearing to 5% of the axial dimension of the bearing.

13. The machine according to claim 1, wherein the cavity has a radial depth having a value at least twenty-five times greater than a radial thickness of the bearing.

14. An installation for converting hydraulic energy into electrical or mechanical energy, or vice versa, the installation including the hydraulic machine according to claim 1.

15. The machine according to claim 1, wherein the cavity has a radial depth having a value fifty times greater than a radial thickness of the bearing.

16. The machine according to claim 1, wherein the cavity is spaced at an axial distance from the first of the two opposite gap limits of the bearing that has a value less than 5% of an axial dimension of the bearing.

* * * * *